Patented Apr. 15, 1924.

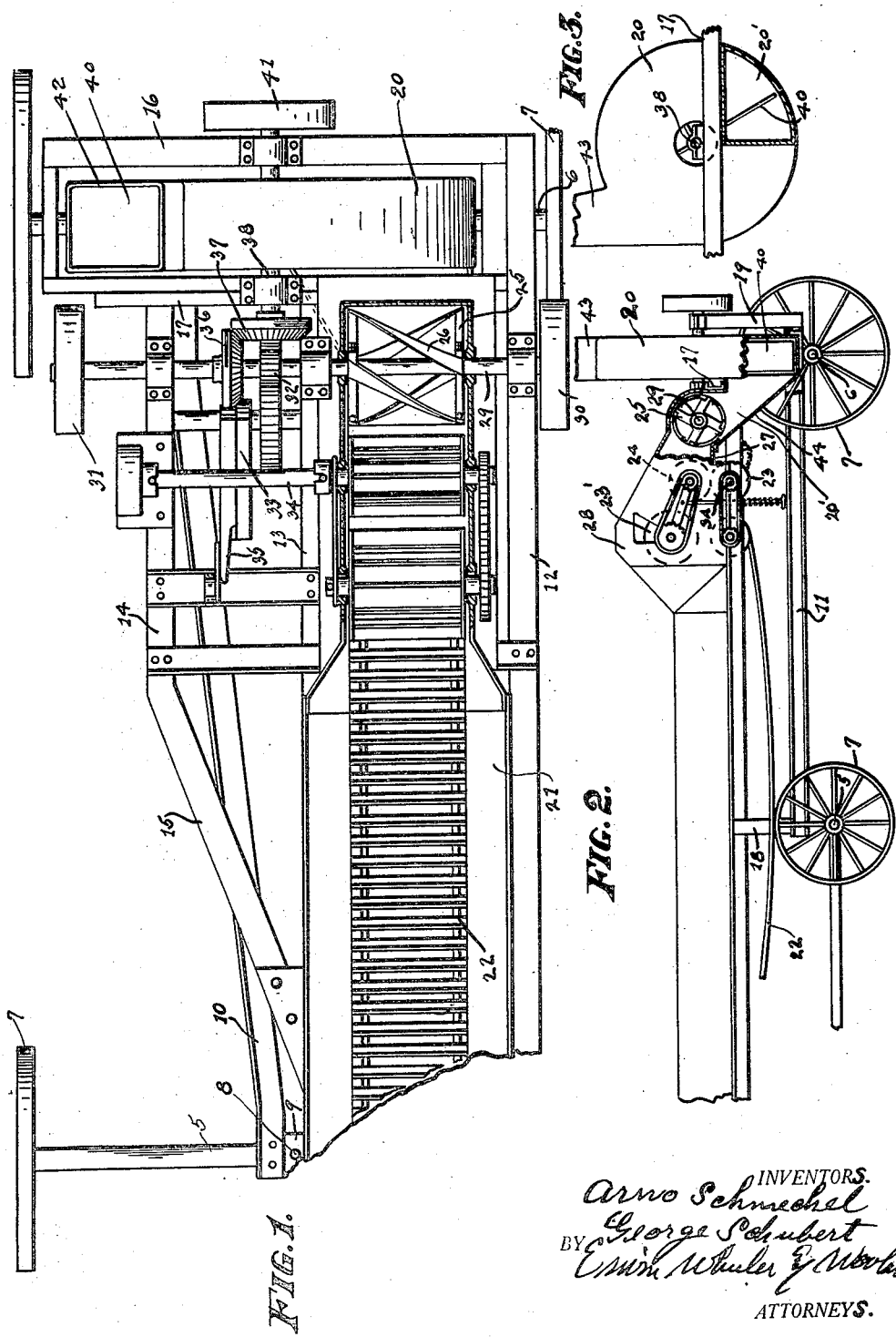

1,490,188

UNITED STATES PATENT OFFICE.

ARNO SCHMECHEL AND GEORGE SCHUBERT, OF THIENSVILLE, WISCONSIN.

ENSILAGE AND FEED CUTTER.

Application filed January 30, 1922. Serial No. 532,846.

*To whom it may concern:*

Be it known that we, ARNO SCHMECHEL and GEORGE SCHUBERT, citizens of the United States, residing at Thiensville, county of Ozaukee, and State of Wisconsin, have invented new and useful Improvements in Ensilage and Feed Cutters, of which the following is a specification.

This invention relates to ensilage and feed cutters. More specifically it relates to that type of ensilage cutting machine which includes a so-called cylindrical cutter and a blowing fan.

This application is a continuation in part of our co-pending application, Serial No. 506,187, filed October 7, 1921.

It is one object of this invention to provide a machine of the type described, which will operate more effectively and with less power than machines which have heretofore been made. As will appear hereinafter, this object is realized by a peculiar arrangement of the cutting blades with respect to the blowing fan.

It is a further object of this invention to provide a mobile ensilage cutter in which the feed table can be placed at a lower height than is possible with machines of ordinary construction. In the ordinary machine of this type, the feed table is so high from the ground as to make it extremely difficult to place heavy bundles of corn thereon.

Further objects of this invention are to provide a novel and particularly compact arrangement of the operating parts, and thereby to promote the stability of the machine; to provide a machine of such construction that the finished article will be extremely light, as compared with other machines for a similar purpose at no expense of strength; to provide a machine in which it will be impossible for the ensilage to clog the passage between the cutter and the fan, while maintaining an extremely low position for the cutter; to provide a machine having positive driving connections between the cutter and blower shafts, thereby making it impossible for the cutter to deliver more material than can be handled by the blower at any given speed; and to provide a machine which may be driven and fed from a plurality of different sides.

In the drawings:—

Figure 1 is a plan view of a machine embodying this invention, portions of the feed table being broken away.

Figure 2 is a side elevation of the same upon a smaller scale.

Figure 3 is a detail view showing a front elevation of the blower casing.

Like parts are identified by the same reference characters throughout the several views.

The machine is supported by front and rear axles 5 and 6 respectively, upon which are journalled wheels 7. The front axle is made dirigible by means of a king pin 8, which passes upwardly through a block 9, which forms a part of the chassis. This machine preferably includes a frame for supporting its feeding, cutting and blowing devices, and this frame is distinct and separate from the chassis.

The chassis includes a pair of longitudinally disposed members 10 and 11, which engage at their forward ends the block 9 and diverge rearwardly therefrom toward the ends of the rear axle adjacent the wheel. Upon this chassis the frame proper is mounted. It will be noted by reference to Figure 1 that the frame includes three longitudinally disposed members 12, 13 and 14 respectively. Members 12 and 13 may extend the full length of the chassis, but member 14 is preferably considerably shorter, and is joined with member 13 by an angularly disposed member 15. A pair of transverse members 16 and 17 adjacent the rear end of the frame serve as a bed upon which the fan of the blowing device is located. Vertically disposed supports 9, as are shown at 18 and 19 in Figure 2, maintain the frame at a sufficient height above the chassis so that the casing 20 of the fan will find clearance above the rear axle 6.

The device includes the usual type of feed table 21, longitudinally of which moves a conveyor belt 22 associated with the inner end of this belt, a set of feeding rollers 23, 24 and 23′ may be provided, the roller 23′ may be floated if desired.

The cutting head 25 is preferably of the cylindrical type as shown. The blades 26 are helical and adapted to be passed successively across the plate 27. The feeding rollers and cutter will preferably be enclosed by a hood or casing 28.

It will be noted that the shaft 29 which carries the cutting head 25 extends completely across the frame of the machine transversely thereto, and is provided at each end with pulleys, here designated at 30 and 31. These pulleys serve to some extent as flywheels, and are adapted also to receive driving belts. A pinion 32 carried by this shaft drives through a chain of gearing, designated in its entirety with the numeral 33, the shaft 34 from which the conveyor belt 22 and the feed rollers are driven. Reversing mechanism and a change speed mechanism may be provided, if desired, in the chain of gearing 33. The change speed and reverse mechanism may be of any desired type, and may be controlled by the handle 35. The particular mechanism used is unimportant to this invention; such mechanism is well known in the art, and is frequently used for the purpose of varying or reversing the operation of the feeding mechanism with respect to that of the cutting mechanism.

A bevel gear wheel 36 upon the cutter shaft 29 meshes directly with the similar gear 37, upon the blower shaft 38. This shaft is preferably disposed parallel to the longitudinal axis of the machine; it passes through the fan casing 20 within which it carries the fan 40. At its outer end it is provided with a pulley 41. This pulley in addition to pulleys 30 and 31 serves as a medium for driving the entire machine. At one side of the casing 20 a tangential outlet port 42 is provided, and the stack 43 is adapted to be secured to those portions of the casing 20 which are immediately adjacent to said port. It is understood that the ensilage cut by head 25 and delivered into casing 20 will be driven up the stack 43 to the top of a silo and delivered therein.

It is particularly desired to emphasize the arrangement of the operative parts of this machine. It will be noted that the feed table with its conveyor belt 22, the feed rollers and the cutting device 25, are disposed in mutual alinement, parallel and adjacent to the frame member 12 at the extreme side of the machine. The blower fan 40, on the other hand, is disposed for rotation in a plane at right angles to the axis of the machine. This fan is preferably equal in diameter to the transverse dimension of the rear end of the frame. It will thus be obvious that the feeding and cutting mechanism is disposed wholly at one side of the axis shaft 38 of the blower. This is at variance with the usual practice, in which the cut material is delivered substantially axially to the blower fan. In the present machine the port 20' into which the ensilage is received into fan casing 20 approximates a quadrant. The cutting head 25 is immediately adjacent this port and sprays the cut material sharply downwardly from the shear plate 27 through a chute 44 into the fan casing 20.

The direct delivery of material by the rapidly rotating cutter head into the path of the fan makes it impossible for any ensilage to accumulate or to feed unevenly through the chute 44 to the blower. It is ordinary practice to rely either upon gravity or upon the suction of the blower to deliver the ensilage to the fan. Those machines which rely upon gravity are frequently troubled by stoppage, due to the accumulation of ensilage in the chute. Those machines which rely upon suction, use excessive power, since the speed of the blower in such machines has to be maintained considerably greater than is necessary merely to impel the ensilage to the top of a silo. In the present device the action of the cutter head is such that the material is virtually sprayed into the fan, and is afforded no opportunity to accumulate in the chute 44. The arrangement is such that the material is not delivered to the center of this fan, but rather to its lower quarter. It is, thus, possible, to set the whole feeding and cutting mechanism at a lower height than has hitherto been necessary, and in addition it has been found that the action of the blower fan upon the material fed thereto is vastly superior,—less power is required to elevate material to a silo of given height with the machine disclosed herein, than was found to be necessary in the use of a number of other machines tested.

A positive and direct connection between the blower and cutter shafts, and their relation at right angles to each other, are also considered to be matters of importance. It is usually necessary in machines of ordinary construction to pass the driving belt over two or more pulleys, the blower and cutter being separately driven. With such machines it is necessary for the machine to be set in fixed relation to the source of power, and there is no possibility of adapting the relative positions of the cutter and the source of power to suit the convenience of a particular silo. Furthermore any slippage of the belt upon the pulley, which drives the heavy blower fan will result in the slowing down of this fan relative to the speed of the cutting and feeding mechanism. It frequently happens that the cutting mechanism operates more rapidly than the material can be cared for by the blower in machines so driven.

In applicants' device it will be noted that provision is made for driving the mechanism from a plurality of points; any one of the three pulleys 31, 30 or 41 may be used as a driving pulley. With this arrangement it is possible for the source of power to occupy at least five different positions with respect to the feed cutter embodying this invention. Incidentally the construction of the frame and chassis is such that the feeding table 21 is accessible from either side or from its end, thereby making it possible to feed the mechanism in such a way as to avoid the possibility of accidental contact with the driving belt, irrespective of the particular manner in which the belt may be connected. Furthermore the fact that the driving of the whole machine is accomplished through a single pulley renders impossible the slowing up of the blower relative to the cutter in the manner which frequently happens in ordinary ensilage cutters. If the speed of rotation of the blower is decreased for any reason, the direct connection between the blower shaft and cutter shaft ensures that the cutter will sustain a corresponding decrease.

By way of illustration of the manner in which the objects hereinbefore specified are met by the device disclosed herein, a brief summary of the advantages of the particular construction illustrated will be here given.

The position of the cutting head at one side of the machine, and its arrangement with respect to the blower, whereby it discharges into one of the lower quadrants of the blower enables the feeding table to be made unusually low and accessible; enables the cutting blade to be disposed in close proximity to the blower, whereby the ensilage will be forcibly discharged by the action of the blades themselves into the blower without the possibility of clogging or intermittent feeding; enables the blower to operate more effectively with a lower expenditure of power than has hitherto been possible; and makes possible the direct connection through a single set of gears between the cutter and blower shafts.

It will be understood that ensilage cutters embodying this invention may be furnished with a variety of gear ratios between the blower and cutter shafts to adapt the machine for service under a variety of conditions. For example, where an unusually tall silo is to be filled, it will be necessary to cause the blower fan to rotate at a correspondingly high speed. It has been found, however, that the speed of rotation of the blower, fed in the manner disclosed herein, need not exceed an average of one-half to two-thirds of the number of revolutions per minute, which are necessary in prior art machines used with a silo of a given type.

Attention is called to the fact that the construction disclosed herein, not only results in the location of the feed table at an unusually low height for a machine employing a cutter head, but also results in a low center of gravity for the whole machine, thereby rendering it more stable and making it possible to use greater tensions upon the driving belt than has hitherto been possible in the type of machine aforesaid.

It will be noted that the discharge pipe 43 is adapted to receive the material from the blowing device after such material has been acted upon by the fan for substantially one-half of a complete revolution. It has been found that where material is fed axially into a centrifugal fan it will frequently be carried by the fan around the casing for several revolutions before it will receive sufficient impetus to travel outwardly to the tips of the fan blades, and thence be delivered into the discharge pipe or stack. Axially fed material collects in the fan, and is delivered intermittently in accumulated masses to the stack in which case the comparatively large masses produce an intermittent rumbling sound as they travel upwardly. In applicants' device it has been found that the material does not thus accumulate in the blower, but is delivered at once therefrom in the same evenly distributed manner in which it is received by the blower fan. The operation of applicants' machine is characterized by an almost total absence of the intermittent rumbling sounds above referred to. Applicants have also discovered that a one-half revolution of the fan is sufficient to discharge the material with full efficiency. The machine operates less effectively when the inlet port is placed at the bottom of the fan casing, than when it is placed in the lower quarter thereof, in the manner shown. On the other hand, it is unnecessary to have more than 180° between the inlet and discharge ports. The particular position illustrated for the inlet port is preferred, therefore, since this position not only permits of a direct connection between the blower and cutter shafts, but allows the feed table to be placed as low as possible, consistently with the most efficient operation of the blower.

We claim:—

1. A feed cutter including a frame, a set of feeding and cutting devices aligned upon one side of the longitudinal axis of said frame, said cutting devices including a cutting head having cylindrically disposed cutting knives, a centrifugal fan shaft disposed adjacent and parallel to said longitudinal axis, a centrifugal fan carried by said shaft and a casing enclosing said fan and provided with an admission port in alignment with said feeding and cutting devices.

2. In a feed cutter, a centrifugal fan, a casing enclosing said fan and provided with an inlet opening wholly laterally offset from and below the axis of said fan, and a set of rotary cutting knives disposed immediately adjacent said opening and arranged to cut ensilage and to spray the cut material through said opening into the casing and into the path of said fan.

3. In a feed cutter provided with a fan casing, the combination with a revoluble fan operative within said casing, of a cutter head disposed wholly at one side of a vertical plane including the axis of said fan exterior to said casing and arranged to deliver cut material into the path of air acted upon by said fan within said casing.

4. In a feed cutter, the combination with a blower rotatable upon a given axis, of a cutter head rotatable upon an axis substantially radial with respect to the axis of the blower, and positioned at one side of the axis of said blower, gearing disposed at the axis of the blower and arranged to connect said blower with said cutter head, and a casing for said blower provided with a port arranged to permit of delivery of material from said cutter head to said blower.

5. In a feed cutter the combination with a machine frame, of a blowing device at one end of said frame including a casing provided with an upwardly directed tangential outlet adjacent one side of the frame, and a sector shaped inlet port adjacent the opposite side of the frame, a shaft passing through said casing, a centrifugal fan carried by said shaft and a cutting device operable in the plane of said shaft upon an axis at right angles thereto, and adapted to discharge the material cut by it directly into said inlet port.

6. In a feed cutter, the combination with a machine frame, of a blowing device at one end of said frame including a casing provided with a tangential outlet adjacent one side of the frame, and a sector shaped inlet port adjacent the other side of the frame, a fan rotatable within said casing, a cutting head rotatable exterior to said casing and adapted to discharge directly into said casing through said inlet port, said cutter head being positioned at one side of the axis of the blower, positive driving connections between said fan and said cutter head, and means in alignment with the cutter head and the opening in said casing for feeding material into the machine.

7. In a feed cutter the combination with a wheeled chassis including front and rear axles, of a machine frame above said chassis, a blowing device including a centrifugal fan mounted at one end of the frame but immediately above one of said axles, for rotation in a vertical plane transverse with respect to said frame, a casing enclosing said fan and provided with an inlet port adjacent one side of the frame, a cylindrical cutting head mounted for rotation adjacent said port about an axis substantially parallel with the plane of rotation of said centrifugal fan, said cutting head being adapted to discharge directly into said blowing device.

8. A feed cutter including a pair of axles and wheels carried thereby, reach members secured to the rear axle adjacent the wheels and converging toward the front axle, a machine frame supported above said axles, the forward portion of said frame being restricted toward one side of the machine, a blowing device carried by the machine frame above and parallel to the rear axle provided with an inlet port wholly at one side of the longitudinal axis of the machine, a cutting device adjacent said port and a feeding conveyor in alignment with said cutting device in said port, said conveyor being disposed along one side of the machine, the arrangement being such that said conveyor is accessible from either side.

9. In a feed cutter the combination with a machine frame, of a transverse shaft, a longitudinal shaft in the same horizontal plane and connected to the transverse shaft by gearing, a centrifugal fan carried by the longitudinal shaft, a casing enclosing said fan provided with a tangential outlet upwardly directed from one side thereof, and a sector shaped inlet at the other side thereof, a cutting device mounted upon the transverse shaft wholly at one side of the longitudinal shaft and adapted to discharge cut material directly into said inlet, and means mounted upon each end of the transverse shaft and upon the outer end of the longitudinal shaft for positively driving the fan and cutter from a plurality of points.

10. In a feed cutter, a blowing device including a casing provided with a tangential outlet and a sector shaped inlet, and means for cutting and delivering material into the sector shaped inlet, said inlet being wholly at one side of said casing.

ARNO SCHMECHEL.
GEORGE SCHUBERT.